3,466,256
SPRAYABLE RUBBER ADHESIVES
John F. Romanick, Irvington, and Arthur B. Pruiksma, Paterson, N.J., assignors to PPG Industries, Inc., Pittsburgh, Pa., a corporation of Pennsylvania
No Drawing. Continuation-in-part of applications Ser. No. 578,997 and Ser. No. 578,972, Sept. 13, 1966. This application May 7, 1968, Ser. No. 727,364
Int. Cl. C08d 9/10; C09j 3/12
U.S. Cl. 260—27  18 Claims

ABSTRACT OF THE DISCLOSURE

Rubber based adhesive compositions of improved properties comprise a carboxyl-containing rubbery addition polymer, a metal contained in an organometallic resin and a solubilizing resin, where the carboxyl-containing polymer and the metal in the organometallic resin are reacted together by mastication at elevated temperature. Compositions containing the adhesive thus obtained in an organic solvent can be easily and efficiently sprayed at low atomization pressures and with minimum cobwebbing, even when the composition has relatively high solids content. They can also be employed as mastic adhesives.

---

This application is a continuation-in-part of copending applications Ser. No. 578,997 and Ser. No. 578,972, both filed on Sept. 13, 1966 and now abandoned.

Rubber-based adhesives in which a rubbery addition polymer is combined with one or more resinous materials have been extensively used for the bonding of various substrates. While such adhesives are quite useful and can be used for many purposes, they have for the most part certain shortcomings which preclude their use in many applications. These include, for instance, certain deficiencies in cohesive strength and heat resistance. One particular disadvantage of such adhesives is that they are difficult to spray at reasonably high non-volatile solids content. That is, when ordinary adhesive compositions of this type contain more than about 20 percent non-volatile solids in an organic liquid medium, spraying of the composition requires extremely high atomization pressures and results in cobwebbing, uneven distribution of the sprayed adhesive, and similar difficulties.

It has now been discovered that outstanding application and preformance properties are obtained from adhesives comprising a carboxyl-containing rubbery addition polymer, a metal contained in an organometallic resin, and a solubilizing resin, where the carboxyl-containing polymer and the metal in the organometallic resin are reacted together, preferably by mastication. Among the improved properties of these adhesives are better heat resistance as reflected by a lowered tendency to creep under stress at elevated temperatures. Furthermore, by reacting the organometallic resin with the carboxylated rubbery polymer prior to dissolving these components in an organic solvent there is obtained a liquid adhesive which is highly sprayable, i.e. such adhesives can be easily and efficiently sprayed at low atomization pressures and with minimal cobwebbing, even when the composition has a high solids content, e.g. above 25 percent non-volatile solids content.

The improved application properties of these adhesives permit them to be used in rapid production line applications, and their combination of properties make them especially useful where both good application properties and resistance to elevated temperatures are desired. Such uses include the application of insulation and automotive interiors such as headliners, and other such applications involving the bonding of metal, cloth, plastics, fiber glass and the like.

The compositions herein can also be used as mastic adhesives, which are high solids, high viscosity materials employed in adhering floor and wall tile, floor coverings, wallboard and panelling, and for similar uses. Mastic adhesives are generally applied using a notched trowel and one of the problems encountered, particularly when good adhesive performance is required, is a tendency of the adhesive to "string" and stick to the trowel. Other disadvantages of many mastic adhesives include certain deficiencies in cohesive strength and heat resistance, and a resistance to flow, known as "nerve," which makes them difficult to apply. Such problems are in large part overcome by mastic adhesives comprising a rubbery addition polymer, an organometallic compound, and a thermoplastic solubilizing resin, where all or part of the rubbery polymer contains carboxyl groups. Such adhesives provide outstanding application and performance properties; for instance, these mastics are characterized by low "nerve" and can be easily applied by trowelling without "stringing" of the adhesive and without excessive sticking of the adhesive to the trowel. Furthermore, the mastic adhesives herein provide good performance properties, such as high strength and heat resistance.

The carboxyl-containing rubbery polymers employed herein are one or more addition polymers of one or more olefinically unsaturated compounds, all or part of which are modified to contain carboxyl groups in the polymer molecule. The polymer or polymers should have an average molecular weight of at least about 30,000 (measured by osmometry) and should contain a total of from about 0.005 to about 0.12 equivalent of bound carboxyl (—COOH) per 100 grams of rubbery polymer. In the case of mastic adhesives the polymer or polymers should contain a total of from about 0.00025 to about 0.12 equivalent of carboxyl per 100 grams of polymer.

Usually, these rubbery polymers contain a major proportion of diene, with the preferred diene being 1,3-butadiene. Other dienes which are also utilized include isoprene, 2,3-dimethyl-1,3-butadiene, 2-neopentyl-1,3-butadiene, 2-chloro-1,3-butadiene, 1-cyano-1,3-butadiene, piperyline, straight and branched chain hexadienes and others.

The preferred dienes are open-chain aliphatic dienes, usually having from 4 to 6 carbon atoms; dienes containing more than 10 carbon atoms are less desirable since they are difficult to polymerize.

Rubbery polymers not made from dienes can also be employed, such as polyisobutylene rubbers.

The carboxyl-containing polymer can be carboxylated homopolymer, such as carboxylated polybutadiene, or it can be a carboxylated copolymer such as a copolymer of a diene with one or more other comonomers in minor proportions. Styrene is a preferred comonomer and carboxylated butadiene-styrene copolymers are the preferred rubbery polymers for use in the invention. Similar copolymers can be made using unsaturated nitriles, such as acrylonitrile or methacrylonitrile, or other comonomers, such as 2-vinyl pyridine and the like.

Various methods are used to introduce carboxyl groups into the polymer. For example, there may be included in the copolymer a copolymerizable monomer which can be hydrolyzed to provide an acidic carboxyl group. Such hydrolyzable comonomers can be, for instance, an alkyl acrylate or methacrylate, or an unsaturated acid chloride, amide or nitrile. When a copolymer of a nitrile such as acrylonitrile is used to make the rubbery polymer, part of the nitrile groups can be hydrolyzed to provide the acidic carboxyl groups desired.

The preferred carboxyl-containing polymers are those in which an ethylenically unsaturated carboxylic acid copolymerizable with the diene (or other unsaturated monomer) and any other comonomer is included in the polymer to produce directly a carboxyl-containing addition polymer. Examples of acids useful in producing carboxyl-containing rubbery polymers include acrylic acid, methacrylic acid, ethacrylic acid, alphachloroacrylic acid, crotonic acid, maleic acid, fumaric acid, 2,4-pentadiendioic-1,3 acid, sorbic acid and other monocarboxylic and polycarboxylic acids containing one or more ethylenic groups and which can be copolymerized with the particular monomer or monomers employed.

The proportions and procedures utilized to provide rubbery polymers as described are well-known; carboxyl-containing polymers are described, for example, in U.S. Patents 2,880,186 and 3,100,160. Various carboxyl-containing rubbery addition polymers of the type used herein are available commercially and these are preferably utilized in the invention.

In the case of mastic adhesives, it is often preferred to utilize a mixture of carboxyl-containing rubbery polymer and non-carboxylated rubbery polymer. In such cases, the rubbery polymer component is comprised of about 5 to about 70 percent by weight and preferably about 10 to about 40 percent by weight, of carboxyl-containing polymer, the remainder (30 to 95 percent and preferably 60 to 90 percent) being rubbery polymer devoid of carboxyl groups. The carboxylated and non-carboxylated polymers can be the same (except for the carboxyl modification) or they can be different, although they should be compatible. The carboxyl-containing polymer employed usually contains from about 0.005 to about 0.12 carboxyl equivalents per 100 grams of polymer, so that in this embodiment the total carboxyl functionality of the rubbery polymer component (including both carboxylated and non-carboxylated polymers) is between about 0.00025 and about 0.084 carboxyl equivalent per 100 grams of rubbery polymer.

The metallic component of the adhesive compositions of the invention is an organic solvent-soluble resinous organometallic compound which contains a metal from Groups I-A, II-A, II-B, or IV-A of the Periodic Table. (The Periodic Table referred to herein is the conventional table found, for instance, at pages 394 and 395 of the "Handbook of Chemistry and Physics," 38th edition, published by the Chemical Rubber Publishing Company.) The carboxyl groups in the rubbery polymer and the metal in the organometallic resin are coreactive and are reacted in producing the adhesives herein to provide many of the desired properties, particularly sprayability. The function of the resinous organic portion of the organometallic resin is to provide the metal in soluble and reactive form, and thus the specific nature of the organic portion of these compounds is not critical.

Ordinarily, the organometallic resin is made by reacting an oxide or hydroxide of the metal with a resinous material containing carboxyl groups, methylol groups or other sites reactive with the metal oxide or hydroxide. One class of organometallic compounds are rosinates, such as magnesium rosinate. These are made by reacting the metal oxide or hydroxide with rosin or a rosin derivative, such as a partial ester of rosin or a rosin-phenol reaction product. Other especially useful reactive resins are made by reacting a metal oxide or hydroxide with a heat-hardenable, oil-soluble phenol-aldehyde resin. Such phenol-aldehyde resins contain methylol groups and are usually made by reacting a para-substituted phenol, such as para-tertiary-butyl phenol, with an excess of formaldehyde using an alkaline catalyst. Other phenols and aldehydes, as well as other procedures, can also be employed to produce useful reactive phenolic resins.

Still other resins which can be used to make the organometallic resin include hydrocarbon resins containing carboxyl or hydroxyl groups, and the like.

Among the metals which can be employed in the organometallic resins used in the adhesives herein are lithium, sodium, magnesium, barium, calcium, zinc, and lead. Magnesium-phenolic reaction products and magnesium rosinate are especially desirable, and lead-phenolic reaction products and zinc-phenolic reaction products also produce good results. Certain organometallic resins of this general class are less satisfactory, one such being zinc rosinate, although they can be used in certain instances if outstanding properties are not required.

The amount of organometallic compound employed should be sufficient to provide from about 0.1 to about 80 parts by weight of the metal for each 100 parts of carboxyl-containing rubbery addition polymer utilized. Generally this means that from about 5 to about 150 parts of organometallic resin (of ordinary metal content) are used for each 100 parts of carboxyl-containing rubbery addition polymer.

The other component of the adhesive herein is a solubilizing resin, which aids in providing a stable homogeneous adhesive of the desired properties. There can be employed for this purpose essentially any resin soluble in the solvent system utilized and compatible with the other ingredients, i.e., which forms a homogeneous solution when mixed with the other components employed.

A number of such resins are available, including rosin and rosin derivatives, such as glycerol, glycol or pentaerythritol esters of rosin, polymerized rosin, hydrogenated rosin or disproportionated rosin; polyterpenes, such as polymerized beta-pinene; hydrocarbon resins such as polymers of cyclopentadiene and polymerized petroleum fractions; chlorinated aromatic hydrocarbon resins, such as chlorinated polyphenyl and resinous chlorinated biphenyl; terpene-phenolic resins, such as the products made from alpha-terpinene and phenol or reaction products of a phenol-aldehyde resin with a rosin-phenol resin; coumarone-indene resins, such as the resinous product of polymerized coal tar light oils; polystyrenes, such as polymerized alpha-methylstyrene; and oil-soluble phenol-aldehyde resins, both heat-hardening and non-heat-hardening.

While it is ordinarily necessary that some amount of solubilizing resin be present in the adhesive composition, the amount is not critical and the maximum amount that can be utilized in any composition depends upon the other components and the properties which are desired. From about 50 to about 450 parts by weight of the solubilizing resin are ordinarily employed for each 100 parts of rubbery polymer present.

It should be noted that all or part of the solubilizing resin employed can be that which is included in the organometallic resin component, so that in some cases no added solubilizing resin may be required. It is only necessary that the above proportion of metal be included and that a total of about 50 to about 450 parts of solubilizing resin be present, including that which is part of the organometallic resin.

As indicated above, among the chief advantages of the adhesives herein is their improved sprayability, which is important when the adhesive is applied in a liquid organic solvent medium. There can be employed for this purpose essentially any solvent or solvent mixture in which the adhesive components can be dissolved and/or dispersed to give a stable, homogeneous composition. Various hydrocarbons, including aliphatic, cyclic and aromatic hydrocarbons and chlorinated hydrocarbons, can be used, as can ketones, esters, and other liquid solvents. Specific solvents that can be employed include hexane, heptane, cyclohexane, toluene, benzene, chlorobenzene, 1,1,1 - trichloroethane, methylene chloride, ethylene dichloride, methylethyl ketone, ethyl acetate, amyl acetate, and the like. It is not necessary that all the solvent components be those in which the adhesive components are soluble, and in fact, the preferred liquid adhesive compositions of the invention are not always completely dissolved. In many cases, the composition is partially dissolved and partially dispersed, although the liquid adhesive should be stable and homogeneous.

The choice of solvents depends largely upon the adhesive components and especially the rubbery polymer. For instance, when carboxylated styrene-butadiene rubbers are utilized aliphatic solvents are preferred.

It is sometimes desirable to add a small amount of magnesium or zinc oxide (or other oxide of the metals mentioned above) to aid in stabilizing the adhesive composition. Conventional formulating additives, such as antioxidants, acid acceptors, stabilizers, fillers and the like can also be added to the adhesive composition if desired, as in the case of conventional rubber-based adhesives.

When employed as mastic adhesives, the compositions herein are of high viscosity; their viscosity is usually above 50,000 centipoises and can be up to several million centipoises. They contain a high proportion of solids, ordinarily about 50 to about 90 percent. The remainder is organic solvent which can be essentially any solvent or solvent mixture in which the components of the adhesive can be dissolved or dispersed to give a stable, homogeneous composition, as described above. Fillers, such as calcium carbonate or talc can be added to give the desired consistency.

The adhesives herein can be made in several ways, but it is necessary that the organometallic compound and the carboxyl-containing rubbery addition polymer be reacted, and this is done prior to the incorporation of these components in the solvent. This is ordinarily accomplished by mastication of the rubbery polymer while in contact with the organometallic compound. By mastication is meant a mechanical working of the materials in which they are subjected to strong shearing forces whereby the rubbery polymer is heated and softened. Mastication can be carried out, for example, on a two roll rubber mill, or on a Banbury mixer, or using a Baker-Perkins internal mixer with dispersion blades. Other methods involving similar action on the materials can also be utilized. Moderately elevated temperatures are employed to insure reaction, and although the mixture is generally heated during the mastication, even when no external heat is supplied the temperature is elevated due to the milling or mixing action taking place. The mixture during mastication usually reaches a temperature between about 150° F. and about 350° F. Preferably some of the solubilizing resin is added during the mastication. It is important to note that while reaction takes place between the carboxylated rubber polymer and the organometallic compound, the products remain at least partially soluble and dispersible.

When the organometallic compound and the carboxyl-containing rubber are prereacted in this manner, the adhesive obtained by blending this mixture with the solvent, any additional solubilizing resin and any other additives provides the described advantages. For example, the adhesive is easily sprayable at low atomization pressures with little or no cobwebbing, using solutions having a solids content substantially higher than those which could be satisfactorily sprayed when made in accordance with the prior art.

While optimum results for many purposes are attained using carboxyl-containing polymer as the sole rubbery addition polymer, products of desirable properties are also provided by utilizing a rubbery polymer devoid of carboxyl groups in place of part of the carboxylated polymer. In the case of liquid adhesives, even when as much as 90 percent of the rubbery polymer is non-carboxyl-containing, the compositions obtained have improved sprayability over corresponding adhesives not containing carboxylated polymer. Ordinarily, however, such adhesives employ a rubbery component in which at least 50 percent, and preferably 80 percent or more, is a carboxyl-containing rubbery polymer. As described above, mastic adhesives may desirably contain 10 to 40 percent of carboxyl-containing rubber in the rubbery component.

The non-carboxylated polymer employed in such embodiments can be made from the same monomers or from different monomers as is the carboxylated polymer, provided the noncarboxylated rubbery polymer is compatible with the carboxylated polymer and the other ingredients. Thus, it can be made from any of the above-mentioned dienes and other monomers. As in the case of the carboxyl-containing polymer, polymers of butadiene are preferred, such as polybutadiene and copolymers of butadiene with minor proportion of styrene or acrylonitrile.

Set forth below are several examples of the invention, which illustrate the adhesive compositions as described above. All parts and percentages in the examples (and throughout this specification) are by weight unless otherwise indicated.

Example 1

In this example, there was employed a carboxyl-containing butadiene-styrene rubber having an average molecular weight of 55,00–70,000 (as determined by osmometry). It was made in accordance with U.S. 2,880,186 and contains interpolymerized methacrylic acid in an amount corresponding to about 0.03 molar equivalents of bound acid (—COOH) per 100 grams of rubber. The organometallic resin used was the reaction product of 7 parts of magnesium oxide with 100 parts of oil-soluble, heat-hardenable phenolic resin made from the alkaline-catalyzed reaction of p-tertiary butyl phenol with excess formaldehyde (Bakelite CKR–1634).

A mixture of 100 parts of the carboxyl-containing rubber with 2 parts of 2,2'-methylenebis(4-ethyl-6-t-butyl-phenol) and 1 part of triphenyl phosphite (antioxidants) was milled for 3 minutes on a steam-heated 2-roll rubber mill. Ten parts of polymerized beta-pinene (ring and ball softening point 115° C.) were added and milled for 7 minutes, and then 25 parts of the MgO-phenolic reaction product were added and milled for 20 minutes. Forty parts more of the beta-pinene resin were then added and milling continued for 10 minutes. During the above milling the mill was maintained at a temperature of 200–240° F. throughout, and the mixture reached a temperature of about 275° F. Using the mill stock thus produced the adhesive was made by mixing the following in a high speed, high shear mixer:

| | Parts by weight |
|---|---|
| Mill stock above | 178 |
| Beta-pinene resin (as above) | 84 |
| Ethylene glycol ester of polymerized rosin (Polypale Ester No. 1) | 67 |
| Hexane | 700 |

After the adhesive had dissolved 6 parts of finely divided silica were added. The product had a solids content of 32 percent and a viscosity of about 700 centipoises.

The above adhesive could be easily sprayed at an atomization pressure of 30 p.s.i. and a fluid pressure of 10 p.s.i., producing good particle definition and little or no cobwebbing. By contrast, spraying of a corresponding adhesive made with a non-carboxyl-containing butadiene-styrene rubbery polymer requires dilution of the adhesive to 20 percent non-volatile solids content and an atomization pressure of 80 p.s.i., and even then produces poor particle definition and a spray with a pronounced tendency to cobweb.

The above adhesive also had good heat resistance; when tested using the Fisher heat resistance test, which is a shear test in which a canvas-steel specimen is placed under a constant load of 500 grams and the temperature is increased until failure, the above adhesive did not fail until a temperature of 165° F.

Example 2

In this example, there was used a mixture of 75 parts of the carboxyl-containing butadiene-styrene rubber used in Example 1 and 25 parts of carboxyl-containing polybutadiene (carboxyl content about 0.05 equivalent per 100 parts of rubber). This mixture was milled (as in Example 1) with 2 parts of the above hindered phenolic antioxidant and 1 part of triphenyl phosphite for 3 minutes, and then 25 parts of the MgO-phenolic reaction product used in Example 1 were milled in for 5 minutes. Following this, 7 parts of the ethylene glycol ester of polymerized rosin and 5 parts of beta-pinene resin (115° C. softening point) were milled in for 5 minutes, 2.5 parts of magnesium oxide were milled in for 2½ minutes, and 20 parts more of the beta-pinene resin were milled in for 5 minutes. The resultant mill stock was mixed in a high speed, high shear stirrer with 130 parts of the ethylene glycol ester of polymerized rosin and sufficient hexane to make the solids content 31 percent. The adhesive obtained had a viscosity of 200 centipoises, and was easily sprayable at 30 p.s.i. atomization pressure and 10 p.s.i. fluid pressure.

Example 3

In this example, there was employed a mixture of 75 parts of the above carboxyl-containing butadiene-styrene rubber and 25 parts of carboxyl-containing butadiene-acrylonitrile rubber (carboxyl content about 0.078 equivalent per 100 parts of rubber). On a heated mill as before, this mixture and 2 parts of the above phenolic antioxidant and 1 part of triphenyl phosphite were milled for 3 minutes, and then 25 parts of the above MgO-phenolic reaction product were milled in for 8 minutes. Five parts of magnesium oxide were milled in for 6 minutes and 40 parts of beta-pinene resin (softening point 135° C.) were milled in for 7 minutes. This stock was then mixed as before with 45 parts of the ethylene glycol ester of polymerized rosin and sufficient hexane to make the solids content 30 percent. The above adhesive was homogeneous and completely dispersed, whereas conventional adhesives of this type would contain undissolved and undispersed butadiene-acrylontrile rubber. The adhesive was easily sprayable under the same conditions as in the above examples.

Example 4

In this example, the carboxyl-containing rubbery polymer employed in Example 1 was used, and the organometallic resin was made by mixing the following at room temperature for 5 days, followed by drying in a vacuum oven at 150° F.:

| | Parts by weight |
|---|---|
| Phenol - formaldehyde resin (described in Example 1) | 100 |
| PbO | 10 |
| Water | 2 |
| Hexane | 112 |

In producing the above adhesive, 100 parts of the carboxyl-containing rubber, 2 parts of phenolic antioxidant (as above) and 1 part of triphenyl phosphite were milled on a steam heated mill for 3 minutes, then 50 parts of the PbO-phenolic reaction product above were added and milled for 6 minutes, followed by 40 parts of beta-pinene resin (softening point 135° C.) which was milled in for 6 minutes. The mill stock obtained was then mixed in a high speed, high shear mixer with 45 parts of the ethylene glycol ester of polymerized rosin and sufficient hexane to make the solids content of the product 26 percent. The adhesive obtained had a viscosity of 170 centipoises and was easily sprayable under the above conditions of had a Fisher heat resistance temperature of 250° F.

Examples 5–12

Example 4 was repeated using several organometallic resins of various types as shown in Table I. The metal-phenolic products were made as in Example 4, using 100 parts of the phenolic resin and 2 parts of water. In making the barium and calcium products, 38 parts of barium oxide and 14 parts of calcium oxide were used respectively. In the case of the lithium-phenolic resin, 8 parts of lithium hydroxide were used, and in the case of sodium, 14 parts of sodium hydroxide were used along with 16 parts of water. The magnesium rosinate was made by reacting 10 parts of the magnesium oxide with 100 parts of polymerized wood rosin. In all cases, sprayable adhesives of desirable properties were obtained.

TABLE I

| Example— | Organometallic resin |
|---|---|
| 5 | Lithium-phenolic. |
| 6 | Sodium-phenolic. |
| 7 | Magnesium-phenolic. |
| 8 | Calcium-phenolic. |
| 9 | Barium-phenolic. |
| 10 | Zinc-phenolic. |
| 11 | Magnesium rosinate. |
| 12 | Magnesium-rosin-phenol.[1] |

[1] Made by reacting 10 parts of magnesium oxide with 100 parts of rosin-phenol reaction product having a softening point of 270° F. and an acid number of 65.

Example 13

This example illustrates the use of a mixture of carboxyl-containing rubber and non-carboxyl containing rubber in a liquid adhesive having improved sprayability as described above. Example 1 was repeated except that 70 parts of the carboxyl-containing rubbery polymer (as in Example 1) were used along with 30 parts of a non-carboxyl containing copolymer of 76.5 percent butadiene and 23.5 percent styrene (SBR 1022). The adhesive obtained had good sprayability; although it was somewhat inferior to the adhesive of Example 1 it was considerably better than the corresponding adhesive made with 100 parts of the non-carbonyl containing polymer.

Example 14

In this example, a mastic adhesive is produced.

A mixture of 100 parts of the carboxylated rubber employed in Example 1 with 2 parts of 2,4'-methylene-bis(4-ethyl-6-t-butylphenol) and 1 part of triphenyl phosphite was milled for 3 minutes on a steam-heated 2-roll rubber mill. While maintaining the mill at 200–240° F., ten parts of beta-pinene resin (softening point 115° C.) were added and milled for 7 minutes, then 25 parts of magnesium-phenolic resin were added. The magnesium-phenolic resin was the reaction product of 7 parts of magnesium oxide with 100 parts of oil-soluble, heat-hardenable phenolic resin made from the alkaline-catalyzed reaction of p-tertiary butyl phenol with excess formaldehyde (Bakelite CKR–1634). After the magnesium-phenolic resin had been milled in for 20 minutes, an additional 40 parts of beta-pinene resin were added and milling continued for 10 minutes. The mill stock thus produced was mixed in a churn with the following until dissolved:

| | Parts by weight |
|---|---|
| Mill stock above | 178 |
| Beta-pinene resin (as above) | 84 |
| Ethylene glycol ester of polymerized rosin | 67 |
| Hexane | 200 |

When dissolved, the following were added:

| | |
|---|---|
| Calcium carbonate | 142 |
| Talc | 142 |
| Asbestos | 68 |

The product was a mastic adhesive of desirable consistency, easily trowellable, having a solids content of 77 percent and a viscosity of about 300,000 centipoises.

Similar results to those exemplified above are obtained using other carbonyl-containing rubbers and other organometallic resins as described hereinabove. Also, other solvents and solvent mixtures can be utilized, as can other additives and the like.

According to the provisions of the patent statutes, there are described above the invention and what are now considered to be its best embodiments. However, within the scope of the appended claims, it is to be understood that the invention can be practiced otherwise than as specifically described.

We claim:
1. A sprayable liquid adhesive composition comprising organic solvent and
   (A) a reaction product formed by masticating at elevated temperature a mixture comprising:
       (1) 100 parts by weight of addition polymer selected from the group consisting of rubbery polymers containing a major proportion of diene and polyisobutylene rubbers, said addition polymer having an average molecular weight of at least about 30,000 and containing from about 0.005 to about 0.12 carboxyl equivalent per 100 grams of polymer; and
       (2) from about 0.1 to about 80 parts by weight of a metal in Groups I–A, II–A, II–B or IV–A of the Periodic Table, the metal being contained in an organic solvent-soluble organometallic resin and being coreactive with the carboxyl groups in said addition polymer; and
   (B) a total of from about 50 to about 450 parts by weight per 100 parts of said addition polymer of solubilizing resin soluble in said organic solvent and compatible with said addition polymer.

2. The composition of claim 1 in which said addition polymer is an interpolymer of diene and ethylenically unsaturated carboxylic acid.

3. The composition of claim 1 in which said organometallic resin is formed by the reaction of an oxide or hydroxide of said metal with an organic resin having free carboxyl or methylol groups.

4. The composition of claim 3 in which said organic resin is rosin.

5. The composition of claim 3 in which said organic resin is an oil-soluble, heat-hardenable phenol-aldehyde resin.

6. The composition of claim 1 in which said rubbery polymer is a carboxylated polymer of butadiene.

7. The composition of claim 6 in which the organometallic resin is magnesium rosinate or a reaction product of magnesium oxide with an oil-soluble, heat-hardenable phenolaldehyde resin.

8. The composition of claim 1 in which said rubbery polymer is a carboxylated copolymer of butadiene with a minor proportion of styrene.

9. A sprayable liquid adhesive consisting essentially of an organic solvent medium and an adhesive composition which comprises
   (A) a reaction product formed by masticating at elevated temperature a mixture comprising
       (1) 100 parts by weight of addition polymer selected from the group consisting of rubbery polymers containing a major proportion of diene and polyisobutylene rubbers, said addition polymer having an average molecular weight of at least about 30,000 and containing from about 0.005 to about 0.12 carboxyl equivalent per 100 grams of polymer; and
       (2) from about 0.1 to about 80 parts by weight of a metal in Groups I–A, II–A, II–B or IV–A of the Periodic Table, the metal being contained in an organic solvent soluble organometal resin and having been reacted with the carboxyl groups in said addition polymer prior to incorporation into said organic solvent medium; and
   (B) a total of from about 50 to about 450 parts by weight per 100 parts of said addition polymer of solubilizing resin soluble in said organic solvent and compatible with said addition polymer.

10. The adhesive of claim 9 in which said rubbery polymer is a carboxylated butadiene-styrene copolymer and said organometallic resin is a magnesium-phenolic resin or magnesium rosinate.

11. The adhesive of claim 10 in which the organic solvent comprises at least a major proportion of aliphatic hydrocarbon.

12. An adhesive composition comprising organic solvent and
   (A) a reaction product formed by masticating at elevated temperature a mixture comprising
       (1) 100 parts by weight of addition polymer selected from the group consisting of rubbery polymers containing a major proportion of diene and polyisobutylene rubbers, said addition polymer having an average molecular weight of at least about 30,000 and consisting of
           (a) carboxyl-containing addition polymer con- rubbery addition polymer devoid of carboxyl equivalent per 100 grams of polymer and
           (b) from 0 to about 90 percent by weight of rubbery addition polymer devoid of carboxyl groups; and
       (2) from about 0.1 to about 80 parts by weight of a metal in Groups I–A, II–A, II–B, or IV–A of the Periodic Table, the metal being contained in an organic solvent-soluble organometallic resin and being coreactive with the carboxyl groups in said addition polymer; and
   (B) a total of from about 50 to about 450 parts by weight of solubilizing resin soluble in said organic solvent and compatible with said addition polymer.

13. The composition of claim 12 in which said rubbery polymers are polymers of butadiene.

14. The composition of claim 13 in which the organometallic resin is a magnesium-phenolic resin or magnesium rosinate.

15. A high viscosity mastic adhesive composition comprising organic solvent and a
   (A) a reaction product comprising a masticated admixture of
       (1) 100 parts by weight of addition polymer selected from the group consisting of rubbery polymers containing a major proportion of diene and polyisobutylene rubbers, said addition polymer having an average molecular weight of at least about 30,000 and consisting of
           (a) carboxyl-containing rubbery addition polymer, and
           (b) from 0 to about 95 percent by weight of rubbery addition polymer devoid of carboxyl groups, said addition polymer containing a total of from about 0.00025 to about 0.12 carboxyl equivalent per 100 grams;
       (2) from about 0.1 to about 80 parts by weight of of a metal in Groups I–A, II–A, II–B or IV–A of the Periodic Table, the metal being contained in an organic solvent-soluble organometallic res- in and being coreactive with the carboxyl groups in said addition polymer; and
   (B) a total of from about 50 to about 450 parts by weight per 100 parts of said addition polymer of solubilizing resin soluble in said organic solvent and compatible with said addition polymer.

16. The composition of claim 15 in which said rubbery polymer is a carboxylated copolymer of butadiene with a minor proportion of styrene.

17. The composition of claim 15 in which the organometallic resin is zinc rosinate.

18. The composition of claim 14 in which said addition polymer consists of (a) carboxyl-containing rubbery addition polymer, and
(b) from 30 to about 95 percent by weight of addition polymer devoid of carboxyl groups, said addition polymer containing a total of from about 0.00025 to about 0.084 carboxyl equivalent per 100 grams.

References Cited

UNITED STATES PATENTS

| | | | |
|---|---|---|---|
| 3,008,912 | 11/1961 | Morris et al. | 260—31.2 |
| 3,044,976 | 7/1962 | Brooks et al. | 260—32.8 |
| 3,100,160 | 8/1963 | Korpman | 117—122 |

OTHER REFERENCES

Skeist, I: "Handbook of adhesives," 1962, p. 968.

DONALD E. CZAJA, Primary Examiner

WILLIAM E. PARKER, Assistant Examiner

U.S. Cl. X.R.

260—25, 31.2, 32.8, 33.6, 33.8

PO-1050
(5/69)

UNITED STATES PATENT OFFICE
CERTIFICATE OF CORRECTION

Patent No. 3,466,256  Dated September 9, 1969

Inventor(s) John F. Romanick and Arthur B. Pruiksma

It is certified that error appears in the above-identified patent and that said Letters Patent are hereby corrected as shown below:

Column 6, line 24, "55,00" should be --55,000--
Column 7, line 70, after "conditions" insert a period (.); "of" should be --It--
Column 8, line 38, "carbonyl" should be --carboxyl--
Column 8, line 74, "carbonyl" should be --carboxyl--
Column 10, Claim 12, subsection (a), delete line 2 and insert --taining from about 0.005 to about 0.12 car- --

SIGNED AND
SEALED
APR 28 1970

(SEAL)
Attest:

Edward M. Fletcher, Jr.
Attesting Officer

WILLIAM E. SCHUYLER, JR.
Commissioner of Patents